United States Patent [19]
Basile

[11] Patent Number: 4,540,146
[45] Date of Patent: Sep. 10, 1985

[54] MOUNTING ARRANGEMENT

[75] Inventor: Peter A. Basile, Hudson, Ohio

[73] Assignee: Black & Decker, Inc., Newark, Del.

[21] Appl. No.: 527,126

[22] Filed: Aug. 29, 1983

[51] Int. Cl.$^3$ ............................................. A47B 57/02
[52] U.S. Cl. .................................. 248/201; 248/243; 248/318; 99/279
[58] Field of Search ............ 248/201, 243, 251, 297.3, 248/317, 318, 327, 223.4, 207, 311.2; 312/334, 335, 301, 330 R, 311; 99/279, 295

[56] References Cited

U.S. PATENT DOCUMENTS

| | | | |
|---|---|---|---|
| 2,043,886 | 6/1936 | De Boer . | |
| 2,354,269 | 7/1944 | Marchand | 248/243 |
| 2,408,755 | 10/1946 | Cahill | 248/201 |
| 2,980,383 | 4/1961 | Anderson . | |
| 3,339,994 | 9/1967 | Reddig | 312/301 |
| 3,606,112 | 9/1971 | Cheshier | 312/334 |
| 3,633,983 | 1/1972 | Whitcomb | 312/301 |
| 3,968,740 | 7/1976 | Brown | 99/304 |
| 4,008,656 | 2/1977 | Gruner | 99/298 |
| 4,047,686 | 9/1977 | Porter . | |
| 4,121,800 | 10/1978 | McClellan . | |
| 4,133,507 | 1/1979 | Chervenak | 248/225.2 |
| 4,159,844 | 7/1979 | Weiner . | |

FOREIGN PATENT DOCUMENTS

| | | | |
|---|---|---|---|
| 295482 | 11/1969 | Australia | 211/105.1 |
| 479245 | 6/1929 | Fed. Rep. of Germany | 312/335 |
| 389192 | 10/1961 | Switzerland | 248/201 |

*Primary Examiner*—Reinaldo P. Machado
*Assistant Examiner*—Alvin Chin-Shue
*Attorney, Agent, or Firm*—Leonard J. Platt

[57] ABSTRACT

A vertically adjustable locking mounting arrangement is provided for a box-like structure to secure the structure, such as a drip coffeemaker, to an overhead support as the bottom of kitchen cabinetry to support the coffeemaker off the counter space. The mounting comprises a horizontal channel in each vertical end wall of the coffeemaker and a pair of spaced identical brackets opposite each channel to secure to the overhead support. Each bracket has a rail-like horizontal hanger removably secured thereon and the hangers are formed to slidingly nest in the channels carrying the coffeemaker structure on the cabinet support. Releasable mechanism locks each hanger to its bracket in only one but multiple selected vertical positions and locks the hanger in the channels to variably and releasably vertically position the coffeemaker structure on the cabinet support in a suspended position off the counter. The brackets are formed of plastic in the shape of open-faced trays with equally spaced honeycomb cells. Each bracket faces the other and each hanger cooperating with its' bracket has a plurality of protrusions that releasably lock the hanger in a nesting relation in the cells for support on the bracket in selected vertical positions. Additionally, a fitting shim can be located to the bracket and disposed between the bracket and the overhead support whereby the shim has a vertical dimension substantially half that of the cells to double the available vertical positions of the bracket and hangers alone.

6 Claims, 7 Drawing Figures

MOUNTING ARRANGEMENT

BACKGROUND OF THE INVENTION

1. Field of the Invention

The invention relates to a mounting arrangement usable with kitchen appliances such as a drip coffeemaker and more particularly, to an improved mounting whereby the drip coffeemaker is suspended from a kitchen cabinet over and off the counter to save and provide additional counter space.

2. Description of the Prior Art

In conventional electric drip coffeemakers, it is common practice to provide a generally C-shaped molded plastic housing with a lower horizontal leg for holding a heated carafe and the other upper horizontal leg forming an overhanging top wall above the carafe and containing a water spreader for dripping hot water through an intermediate coffee brew basket into the carafe. The connecting vertical leg usually contains an internal water reservoir and heating chamber to supply heated water through tube means to the water spreader in the top wall of the housing and into the coffee brew basket. Such coffeemakers have widely replaced the percolator types and this general type as shown in U.S. Pat. No. 3,968,740 may come in numerous sizes including smaller four cup coffeemakers of generally similar construction as shown in U.S. Pat. No. 4,142,840, both patents of common assignment. One of the problems associated with such coffeemakers is the usual one of an extra appliance to be set on the kitchen counter to take up space. Applicant's assignee has come out with a line of appliances that are suspended directly under the kitchen cabinetry such as off of the counter and elsewhere to provide additional counter space. Typical of these space-saving arrangements are microwave ovens, electric knives, and electric can openers.

SUMMARY OF THE INVENTION

In accordance with the invention, a vertically adjustable and locking mounting arrangement is provided for a box-like structure such as a rectangular boxed drip coffeemaker to secure the coffeemaker to an overhead support such as a kitchen cabinet to free counter space. The coffeemaker housing has a horizontal channel in each vertical end wall and a pair of spaced identical brackets is provided, one opposite each channel, to secure to the overhead support with each bracket having a rail-like horizontal hanger removably secured thereon. The hangers are formed to slidingly nest in the channels to carry the coffeemaker structure on the cabinet support. Releasable means are provided to lock each hanger to its corresponding bracket in selected vertical positions and to lock each hanger in its channel to variably and releasably and vertically position the coffeemaker suspended from the support. For simplicity, each identical bracket is formed as an open face tray with multiple honeycomb cells therein and it is secured to the overhead support facing the opposite bracket. Each cooperating hanger has a plurality of protrusions to releasingly and lockingly nest in the cells for support on the bracket in selected vertical positions. The parts are formed to fit and lock together in only one horizontal position but in multiple vertical positions and a fitting shim may be used. The shim preferably has a vertical dimension half that of the cells to double the available vertical positions of the bracket and hangers if used alone to thus provide a wide selection of vertical supporting positions. The entire mounting components are preferably plastic such as a molded polycarbonate of relatively deep-sectioned tray-like parts for strength and versatility. Thus, the main object of the present invention is to provide a mounting arrangement for an appliance such as a drip coffeemaker to support it from kitchen cabinets of various designs off of the kitchen counter in multiple vertical positions and thus free counter space for other operations.

A further object is to provide such mounting structure that is easily formed of deep sectioned plastic components to absorb lateral impacts, support the weight of the fully loaded coffeemaker, and provide a solid well mounted arrangement.

A further object is to provide such a system that may be easily handled and installed by the user with a minimum of tools and mechanical ability while still providing a solid, pleasing, and functionally correct supporting structure.

DESCRIPTION OF THE PREFERRED EMBODIMENT

Figure 1:
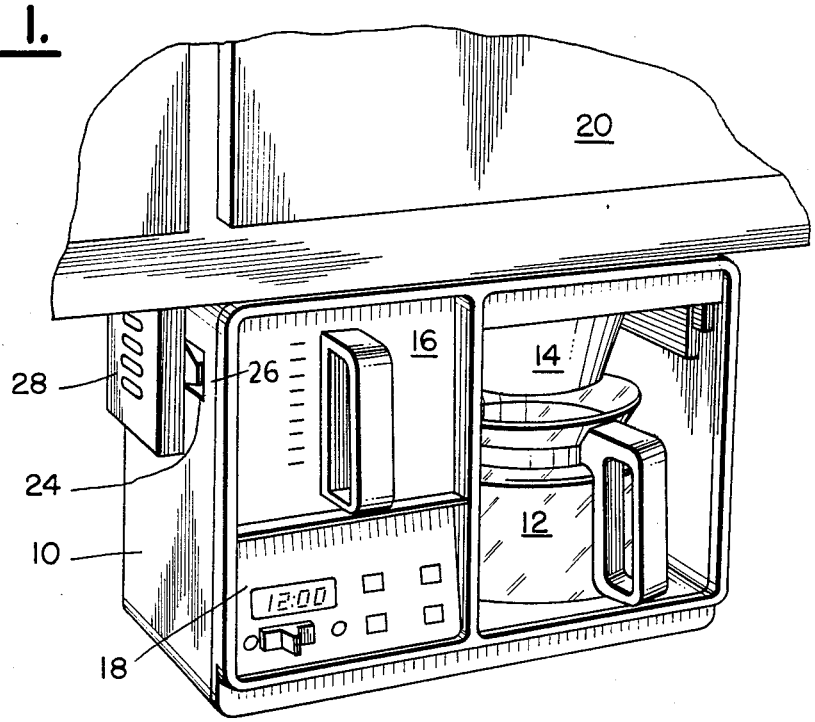
FIG. 1 is a front partially perspective view of a mounted drip coffeemaker.

Referring to FIG. 1 there is shown an electric coffeemaker of a generally box-like structure or square design which includes a molded plastic housing 10 having a support for receptacles such as a heated carafe 12 with an upper horizontal portion containing a water spreader above a coffee basket 14 into which heated water is dripped to make coffee which, in turn, drips into carafe 12 in generally conventional drip coffeemaker fashion. An adjacent portion includes a removable water reservoir 16 that may be filled at the sink and placed in position much like a drawer where the water is heated by internal mechanism controlled from panel 18 and dispensed through basket 14 as brewed coffee into carafe 12.

While the structure for mounting box 10 as will be explained, is equally applicable to any box-like structure that may contain an appliance for the same or similar use it is described with respect to the coffeemaker only as a preferred embodiment. The coffeemaker is designed to conserve or save space by suspending it from the usual kitchen metal or wooden cabinetry off and generally although not necessarily above the kitchen counter and is adaptable to cabinets with various depths of overlapping trim 22 as will become apparent.

Figure 3:
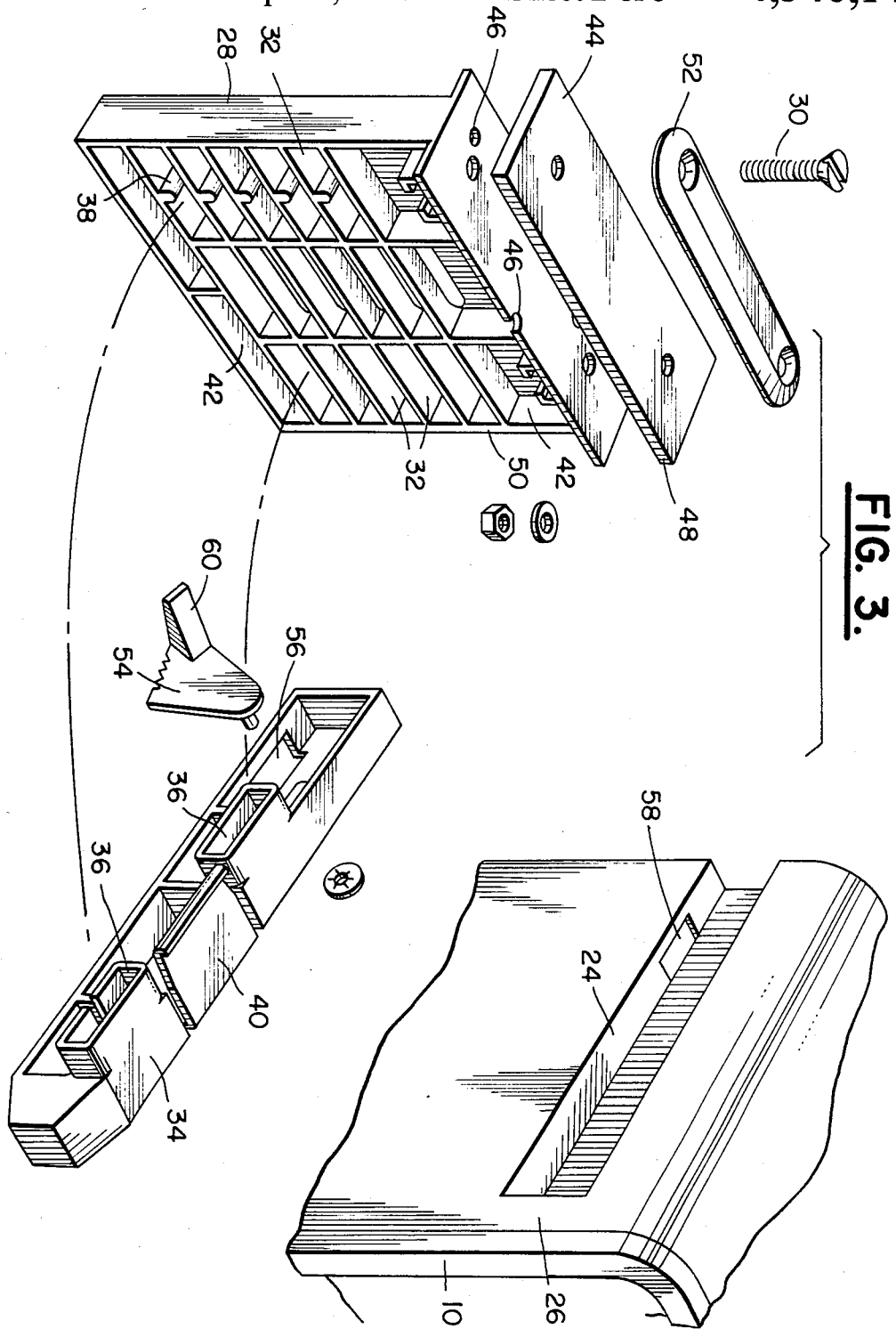
FIG. 3 is an exploded perspective of the parts of a bracket and hanger and coffeemaker housing for one side of the device.

In accordance with the invention, it is desirable that a simple, easy, owner-installed, mounting arrangement be provided adaptable to all kinds of general kitchen cabinets and which holds the coffeemaker securely in position with as few structural parts as possible, is easily adjustable, and presents a pleasing appearance. To this end, the box-like structure or coffeemaker housing 10 is provided with a horizontal channel 24 in each vertical end wall of the box structure as seen in FIGS. 1 and 3. For purposes that will become apparent, the channels in the box end walls have stops 26 at one end to limit the inward movement of housing 10 when it is pushed and clicked into locked position to orient the box structure with respect to the overhead support.

Figure 4:
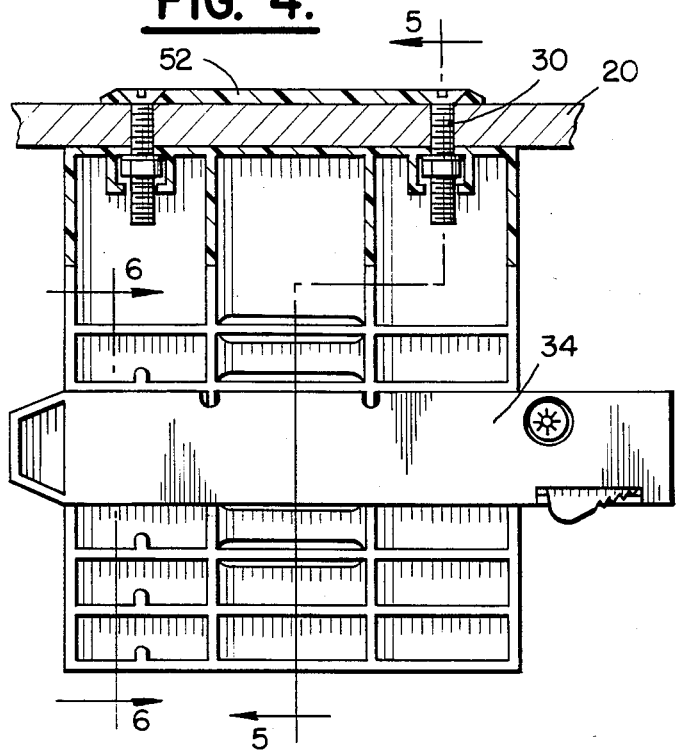
FIG. 4 is a section on line 4—4 of FIG. 2 of the bracket and hanger.
Figure 5:
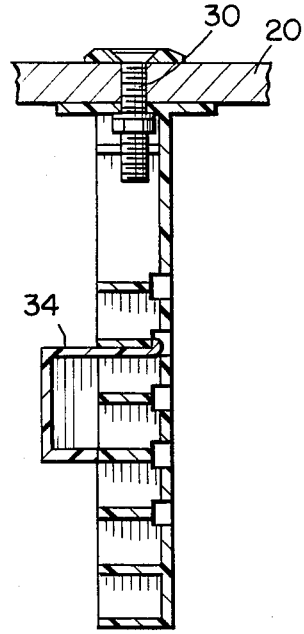
FIG. 5 is a section on line 5—5 of FIG. 4.
Figure 6:
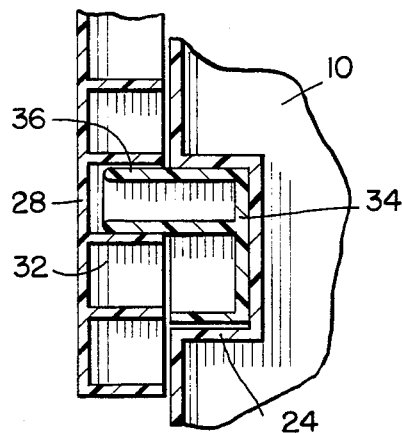
FIG. 6 is a partial section on line 6—6 of FIG. 4.
Figure 7:
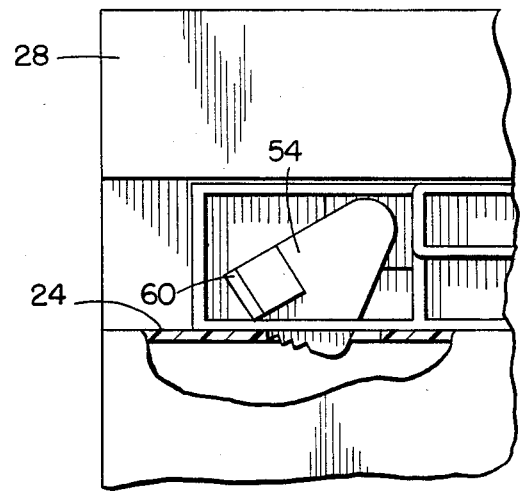
FIG. 7 is an enlarged view, partly in section, showing the locking between bracket and hanger.

Cooperating with the horizontal channels is a pair of identical brackets 28 that are spaced from one another and are disposed opposite the channels and secured by bolts 30 to the overhead cabinet support 20 as seen in FIGS. 4 and 5.

Figure 2:
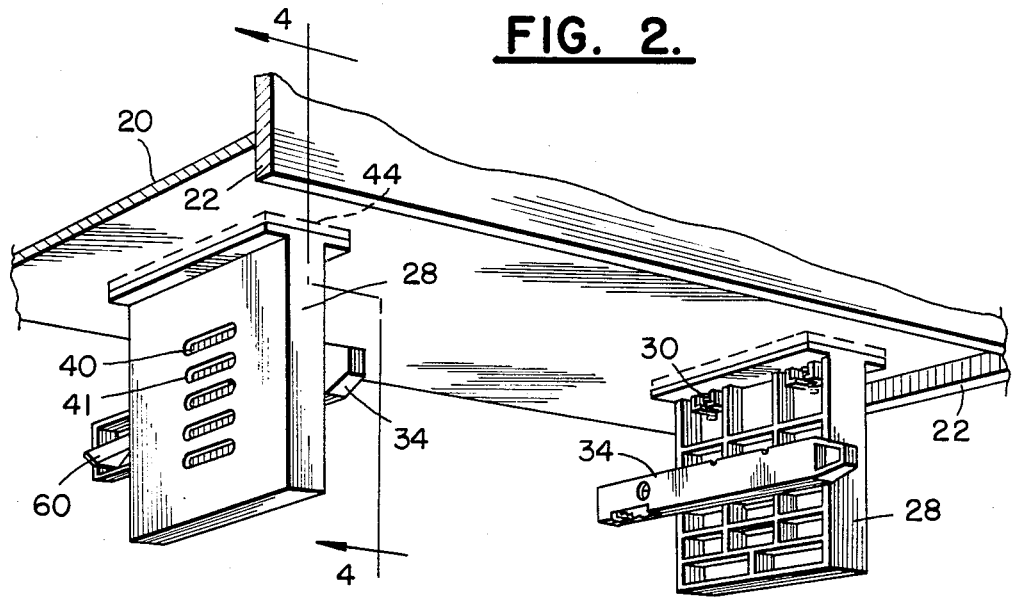
FIG. 2 is a partial perspective showing the mounting applied to the underside of the cabinet with an optional shim shown dotted.

The individual structure of the bracket is significant in its simplicity and adjustability. To this end, the brackets on either side are identical and only one need be described. As seen in FIG. 3, bracket 28 is an open face tray with a plurality of equally spaced rectangular or honeycomb cells 32 formed therein in a relatively deep sectioned tray, the parts all being formed of a molded plastic and the square or honeycomb cell structure lending great strength as well as other funtional characteristics that will become apparent. As seen in FIG. 2, brackets 28 are disposed in spaced relation to face one another and are identical in construction and supported from cabinet 20 so each bracket faces the opposite bracket. Cooperating with each bracket, is a rail-like horizontal hanger 34 designed to be removably secured to its bracket. The hanger, as disclosed, is made for the left or right bracket as will be apparent. In this execution, each hanger is formed with a plurality of protrusions 36 that are shaped to nest in cells 32 and, with suitable molded locating ridges 38, are formed to fit and locate together in only one horizontal position as generally indicated by the broken line in FIG. 3. That is, hangers 34 fit in brackets 38 in only one horizontal position where the protrusions fit only the aligned cells 32. Thus, while hanger 34 fits in the bracket in only one horizontal position, as will be seen, it is movable vertically to many positions. Any suitable arangement for locking the hanger in its nesting position in the bracket may be used. For example, a molded flexible tongue 40 may lock in slots 41 to the bracket as seen in FIG. 2. The hanger is easily removable by thumb and finger by merely squeezing tongue 40 and pulling the hanger out of bracket 28. For versatility, the hanger 34 may be disposed in any selected vertical position in the bracket 28 by inserting the protrusions in any one of the layers of equally spaced honeycombed cells 32. Thus, the hanger may be releasably and lockingly nested in the honeycomb cells for support on the bracket and locked therein in only one horizontal but in multiple vertical positions.

As shown in FIG. 3, there are five vertical positions in the bracket in which hanger 34 may be adjustaly mounted, the top and bottom rows 42 not being used thus leaving five cell spaces 32 for use. For convenience the cell spaces 32 may be one half inch in vertical height, thus providing one half inch increments, depending on the location of hanger 34, for a total adjustment of two inches. However, in order to double the five positions available, an optional fitting shim 44 may be provided and formed to fit and locate the bracket top by suitable stubs molded therein and fitting in cutouts 46 by attaching to the bracket top between the bracket and support 20. For doubling the vertical positions, the shim may have a vertical dimension 48 only half that of the cell dimension 50 to give an additional five one quarter inch increments. It can be seen that the use of the shim then provides one quarter inch adjustments rather than one half inch adjustments. Thus, the vertical position with the use of the shim, may be one quarter inch, one half, three quarters, one inch etc. thus doubling the available vertical positions of the hangers.

For a clean installation, screw plates 52 may be used on the inner surface of the cabinet to receive and improve or smooth any protrusion of bolt 30 inside the cabinetry as seen in FIGS. 4 and 5.

In order to lock the hangers in position on the support, a simple pivoted latch hook 54 with teeth is provided to drop, by gravity, through openings 56 and 58 in the hanger and bracket respectively to lock the hanger in grooves 24 thus cooperating to position the housing with respect to the support. A small tab 60 makes it easy to release by just reaching in and actuating each tab 60 and then slide the entire appliance housing 10 forward out of the mounting.

With the mounting structure described, the housing may be mounted flush with as shown in FIG. 1, behind, or forward of trim 22 as desired and as determined by the position of brackets 28 which are conveniently located by a marked paper template supplied with the mounting structure.

Thus, the invention provides a mounting arrangement for any box-like structure to secure it to an overhead support. It is especially adaptable to the preferred coffeemaker mounting described herein and uses a minimum number of easily formed (identical brackets) and structurally strong plastic parts that may be conveniently installed by the user and is a mounting in which the entire coffeemaker may be located in any number of vertical positions and easily removed all to conserve space on the kitchen counter in a standard kitchen.

While I have hereinbefore described a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

I claim:

1. A vertically adjustable locking mounting arrangement for a box-like structure securing the structure to an overhead support comprising, a horizontal channel in each vertical end wall of the box structure, a pair of spaced identical brackets opposite the channels to secure to said support, each bracket having a rail-like horizontal hanger removably secured thereon, said hangers formed to slidingly nest in said channels carrying said structure on said support, releasable means locking each hanger to its bracket in selected vertical positions and locking said hanger in said channels to variably and releasably vertically position said structure on said support, each identical bracket being formed as an open face tray with a plurality of equally spaced honeycomb cells therein and secured to said support facing the opposite bracket, and each hanger having a plurality of protrusions releasingly and lockingly nesting in said cells for support on said bracket in selected vertical positions.

2. Apparatus as described in claim 1 wherein said horizontal channels in the box end walls have stops at one end oriented with said releasable hanger locking means to position said box structure with respect to the overhead support.

3. Apparatus as described in claim 2 wherein said protrusions and matching cells are formed to fit and lock together in only one horizontal but in multiple vertical positions.

4. Apparatus as described in claim 3 wherein each bracket has a fitting shim located to said bracket and disposed between said bracket and said support,
   said shim having a vertical dimension substantially half that of said cells to double the available vertical positions of said bracket and hangers alone.

5. Apparatus as described in claim 4 wherein said box-like structure is
   a rectangular-shaped appliance such as a drip coffeemaker and
   said overhead support is the substantially flat under surface of kitchen cabinetry
   whereas said mounting system removably and adjustably supports said coffeemaker from the underside of said cabinetry and spaced above the counter in a standard kitchen to conserve counter space.

6. Apparatus as described in claim 5 wherein said mounting components are a molded plastic of relatively deep-sectioned tray-like parts for strength and flexibility.

* * * * *